US012385569B2

(12) United States Patent
Feng et al.

(10) Patent No.: US 12,385,569 B2
(45) Date of Patent: Aug. 12, 2025

(54) REVERSIBLE ELECTROMAGNETIC VALVE, AND AIR CONDITIONING UNIT HAVING SAME

(71) Applicant: ZHEJIANG DUNAN ARTIFICIAL ENVIRONMENT CO., LTD., Shaoxing (CN)

(72) Inventors: Zhongbo Feng, Shaoxing (CN); Yunjun Xiong, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 66 days.

(21) Appl. No.: 18/513,546

(22) Filed: Nov. 18, 2023

(65) Prior Publication Data

US 2024/0084900 A1    Mar. 14, 2024

Related U.S. Application Data

(63) Continuation of application No. PCT/CN2022/094038, filed on May 20, 2022.

(30) Foreign Application Priority Data

May 20, 2021    (CN) ......................... 202121097730.X
Dec. 7, 2021    (CN) .......................... 202111489240.9

(51) Int. Cl.
*F16K 3/02*    (2006.01)
*F16K 3/18*    (2006.01)
(Continued)

(52) U.S. Cl.
CPC .............. *F16K 3/0254* (2013.01); *F16K 3/18* (2013.01); *F16K 31/122* (2013.01); *F25B 41/26* (2021.01); *F25B 2313/027* (2013.01)

(58) Field of Classification Search
CPC .......... F16K 3/0254; F16K 3/029; F16K 3/18; F16K 31/122; F16K 41/02; F16K 41/04;
(Continued)

(56) References Cited

U.S. PATENT DOCUMENTS 3,606,242 A * 9/1971 Lathrop ................ F16K 3/0254
91/275
3,624,802 A * 11/1971 Ripert ..................... F16K 41/02
92/167
(Continued)

FOREIGN PATENT DOCUMENTS

CN    201031961 Y  *  3/2008
CN    102734494 A  *  10/2012
(Continued)

OTHER PUBLICATIONS

International Search Report of PCT/CN2022/094038.
Notice of Reasons for Refusal of JP2023564126.
European search report of EP22804056.4.

*Primary Examiner* — David Colon-Morales

(57) ABSTRACT

A reversible electromagnetic valve and an air conditioning unit are provided. The reversible electromagnetic valve includes a valve body and a valve core assembly. A first communication port and a second communication port are respectively formed in two sides of the valve body provided with a valve cavity. The valve core assembly is capable of slidably moving in the valve cavity and includes a connecting rod, a slider unit and a piston unit. The slider unit and the piston unit are respectively connected to two ends of the connecting rod. The slider unit is arranged adjacent to the first communication port and the second communication port opposite to each other. The slider unit is configured to block both the first communication port and the second
(Continued)

communication port and the piston unit is capable to be pushed to slide in the valve cavity.

18 Claims, 11 Drawing Sheets

(51) Int. Cl.
*F16K 31/122* (2006.01)
*F25B 41/26* (2021.01)

(58) Field of Classification Search
CPC .......... F16K 41/06; F25B 41/26; F25B 13/00; F25B 2313/027
See application file for complete search history.

(56) References Cited

U.S. PATENT DOCUMENTS

| | | | | | |
|---|---|---|---|---|---|
| 3,808,829 | A | * | 5/1974 | Peruglia | F25B 41/20 251/30.02 |
| 3,958,592 | A | * | 5/1976 | Wells | F16K 41/02 137/246.22 |
| 4,240,469 | A | * | 12/1980 | Bauer | F16K 27/041 137/625.25 |
| 4,248,058 | A | * | 2/1981 | Bauer | F25B 41/26 236/80 G |
| 4,477,052 | A | * | 10/1984 | Knoblauch | F16K 31/122 92/90 |
| 4,492,252 | A | * | 1/1985 | Kanai | F25B 41/26 92/194 |
| 4,516,752 | A | * | 5/1985 | Babbitt | F16K 41/04 277/529 |
| 4,630,636 | A | * | 12/1986 | Cutcher | F16K 41/04 137/315.35 |
| 4,644,760 | A | * | 2/1987 | Aoki | F25B 41/26 137/625.43 |
| 4,712,582 | A | * | 12/1987 | Marks | F25B 41/26 335/278 |
| 4,986,299 | A | | 1/1991 | Schultz | |
| 5,375,812 | A | * | 12/1994 | Kent | F16K 41/04 277/550 |
| 5,454,547 | A | * | 10/1995 | Brown | F16J 15/18 251/266 |
| 5,908,046 | A | * | 6/1999 | Mosman | F16K 41/02 277/408 |
| 6,089,531 | A | * | 7/2000 | Young | F16K 41/04 251/285 |
| 6,840,495 | B2 | * | 1/2005 | Jahn | F16K 41/02 251/63.5 |
| 7,108,008 | B2 | * | 9/2006 | Moreno | F25B 41/26 137/454.2 |
| 8,800,957 | B2 | * | 8/2014 | Saine | F16K 31/40 251/30.01 |
| 9,982,515 | B2 | * | 5/2018 | Taylor | E21B 23/02 |
| 10,132,417 | B2 | * | 11/2018 | Song | F16K 31/124 |
| 10,337,624 | B2 | * | 7/2019 | Hoang | E21B 34/06 |
| 2006/0242987 | A1 | * | 11/2006 | Zhu | F25B 41/26 62/352 |
| 2022/0333696 | A1 | * | 10/2022 | Kibune | F16K 11/0655 |

FOREIGN PATENT DOCUMENTS

| | | | | | |
|---|---|---|---|---|---|
| CN | 103542102 | A | * | 1/2014 | ................ F16K 1/00 |
| CN | 105626869 | A | * | 6/2016 | |
| CN | 106641333 | A | * | 5/2017 | .......... F16K 11/0655 |
| CN | 107869601 | A | * | 4/2018 | .......... F16K 11/0655 |
| CN | 207470843 | U | * | 6/2018 | |
| CN | 106246956 | B | * | 8/2018 | .......... F16K 11/0655 |
| CN | 106247701 | B | * | 10/2018 | ................ F25B 41/04 |
| CN | 109563946 | A | * | 4/2019 | ............. F16K 27/04 |
| CN | 216479253 | U | | 5/2022 | |
| CN | 216742923 | U | | 6/2022 | |
| DE | 3405681 | A1 | | 8/1985 | |
| DE | 3405681 | C2 | * | 7/1988 | |
| DE | 102016109865 | A1 | | 11/2017 | |
| FR | 1196093 | A | * | 11/1959 | |
| GB | 1591634 | A | * | 6/1981 | .......... F01D 17/145 |
| GB | 2497850 | A | * | 6/2013 | ................ F16J 15/18 |
| JP | S59029473 | U | | 2/1984 | |
| JP | S62264185 | A | * | 11/1987 | |
| JP | H02102083 | U | * | 8/1990 | |
| JP | H04282090 | A | | 10/1992 | |
| JP | 0599366 | A | | 4/1993 | |
| JP | 0765696 | B2 | | 7/1995 | |
| JP | H11325634 | A | * | 11/1999 | |
| JP | 2003278937 | A | | 10/2003 | |
| JP | 2007085494 | A | * | 4/2007 | |
| JP | 2016136068 | A | * | 7/2016 | |
| JP | 2018031461 | A | * | 3/2018 | ............. F16K 27/04 |
| WO | WO-2014078619 | A2 | * | 5/2014 | ............. E21B 34/02 |
| WO | WO2020052989 | A1 | | 3/2020 | |

* cited by examiner

REVERSIBLE ELECTROMAGNETIC VALVE, AND AIR CONDITIONING UNIT HAVING SAME

CROSS-REFERENCE TO RELATED APPLICATIONS

This application is a continuation of international patent application No. PCT/CN2022/094038, filed on May 20, 2022, which itself claims priority to Chinese patent application Nos. 202121097730.X, filed on May 20, 2021, titled "REVERSIBLE ELECTROMAGNETIC VALVE, AND AIR CONDITIONING UNIT HAVING SAME", and 202111489240.9, filed on Dec. 7, 2021, titled "REVERSIBLE ELECTROMAGNETIC VALVE", which are hereby incorporated by reference.

TECHNICAL FIELD

The present disclosure relates to a field of refrigeration, and in particular, to a reversible electromagnetic valve and an air conditioning unit having the same.

BACKGROUND

A reversible electromagnetic valve is usually installed in an air conditioning unit and used for achieving bidirectional circulation of a medium.

A valve core assembly of a traditional reversible electromagnetic valve includes a connecting rod, a slider and two piston units. The two piston units are connected to two ends of the connecting rod respectively. In the process that the medium pushes the valve core assembly to move, the two piston units need to be pushed to slide, however, it has a large friction force when the piston units slide in a sealed valve cavity, a greater thrust is required for the medium pushing the two piston units to slide, therefore it needs a large valve opening pressure difference for the reversible electromagnetic valve in the related art.

SUMMARY

According to various embodiments of the present disclosure, a reversible electromagnetic valve is provided.

A reversible electromagnetic valve is provided, including a valve body and a valve core assembly. A first communication port and a second communication port are respectively formed in two sides of the valve body. The valve body is provided with a valve cavity. The valve core assembly is arranged in the valve cavity. The valve core assembly is capable of slidably moving in the valve cavity to enable the first communication port and the second communication port to be in communication with each other or out of communication with each other. The valve core assembly includes a piston unit, a connecting rod and a slider unit. The slider unit and the piston unit are respectively connected to two ends of the connecting rod. The slider unit is arranged adjacent to the first communication port and the second communication port. The first communication port and the second communication port are opposite to each other. The slider unit is configured to block the first communication port and the second communication port at the same time. The piston unit is capable to be pushed to slide in the valve cavity due to a pressure difference between two sides of the piston unit.

In some embodiments, the reversible electromagnetic valve further includes an intermediate end cover and a second end cover. The intermediate end cover is fixed in the valve cavity. The piston unit is arranged on one side of the intermediate end cover away from the first communication port and the second communication port. A first cavity is defined by the intermediate end cover and the piston unit. A second cavity is defined by the piston unit and the second end cover.

In some embodiments, the reversible electromagnetic valve further includes a pilot valve, disposed on the valve body. The valve body is provided with a first hole and a second hole. The first hole is in communication with the first cavity. The second hole is in communication with the second cavity. The pilot valve is respectively in communication with the first hole and the second hole through a capillary tube. The pilot valve is configured to control a pressure difference between the first cavity and the second cavity.

In some embodiments, the reversible electromagnetic valve further includes a first end cover disposed at an end of the valve body away from the second end cover. A medium cavity is defined between the first end cover and the intermediate end cover. The slider unit is disposed in the medium cavity, and when the reversible electromagnetic valve is in a first position, the first communication port and the second communication port are respectively in communication with the medium cavity.

In some embodiments, a side surface of the piston unit facing the intermediate end cover is provided with a first protrusion, and when the piston unit moves towards the first communication port and the second communication port, the first protrusion is capable of abutting against the intermediate end cover; and/or a side surface of the piston unit facing the second end cover is provided with a second protrusion, and when the piston unit moves towards the second end cover, the second protrusion is capable of abutting against the second end cover.

In some embodiments, a side surface of the piston unit facing the intermediate end cover is provided with a first protrusion, the first protrusion is in an annular shape, a side surface of the first protrusion is provided with a first throttling hole for allowing a medium to flow out of a groove formed by the first protrusion; and/or a side surface of the piston unit facing the second end cover is provided with a second protrusion, the second protrusion is in an annular shape, a side surface of the second protrusion is provided with a second throttling hole for allowing a medium to flow out of a groove formed by the second protrusion.

In some embodiments, a side surface of the piston unit facing the intermediate end cover is provided with a first protrusion, the first protrusion is in an annular shape, a side surface of the first protrusion is provided with a first throttling groove for allowing a medium to flow out of a groove formed by the first protrusion; and/or a side surface of the piston unit facing the second end cover is provided with a second protrusion, the second protrusion is in an annular shape, a side surface of the second protrusion is provided with a second throttling groove for allowing a medium to flow out of a groove formed by the second protrusion.

In some embodiments, the slider unit includes a first portion and a second portion opposite to each other, the first portion is capable of blocking the first communication port, the second portion is capable of blocking the second communication port, an accommodating cavity is formed between the first portion and the second portion, an elastic member is arranged in the accommodating cavity, and two ends of the elastic member abut against the first portion and the second portion respectively.

In some embodiments, the valve cavity includes a medium cavity. The slider unit is arranged in the medium cavity. A balance hole is formed in the first portion and/or the second portion. The medium cavity is in communication with the accommodating cavity through the balance hole.

In some embodiments, the slider unit further includes a guide frame. The guide frame is sleeved on an outer side of the first portion and the second portion and connected to the connecting rod.

The present disclosure further provides an air conditioning unit including the above reversible electromagnetic valve.

The details of one or more embodiments of the present disclosure are set forth in the following drawings and description. Other features, objects, and advantages of the present disclosure will become apparent from the description, drawings, and claims.

BRIEF DESCRIPTION OF THE DRAWINGS

To better describe and illustrate embodiments and/or examples of the present disclosure, reference may be made to one or more drawings. Additional details or examples for describing the figures should not be considered limiting of the scope of any of the present disclosure, presently described embodiments and/or examples, and the best modes of these applications presently being understood.

Figure 1:
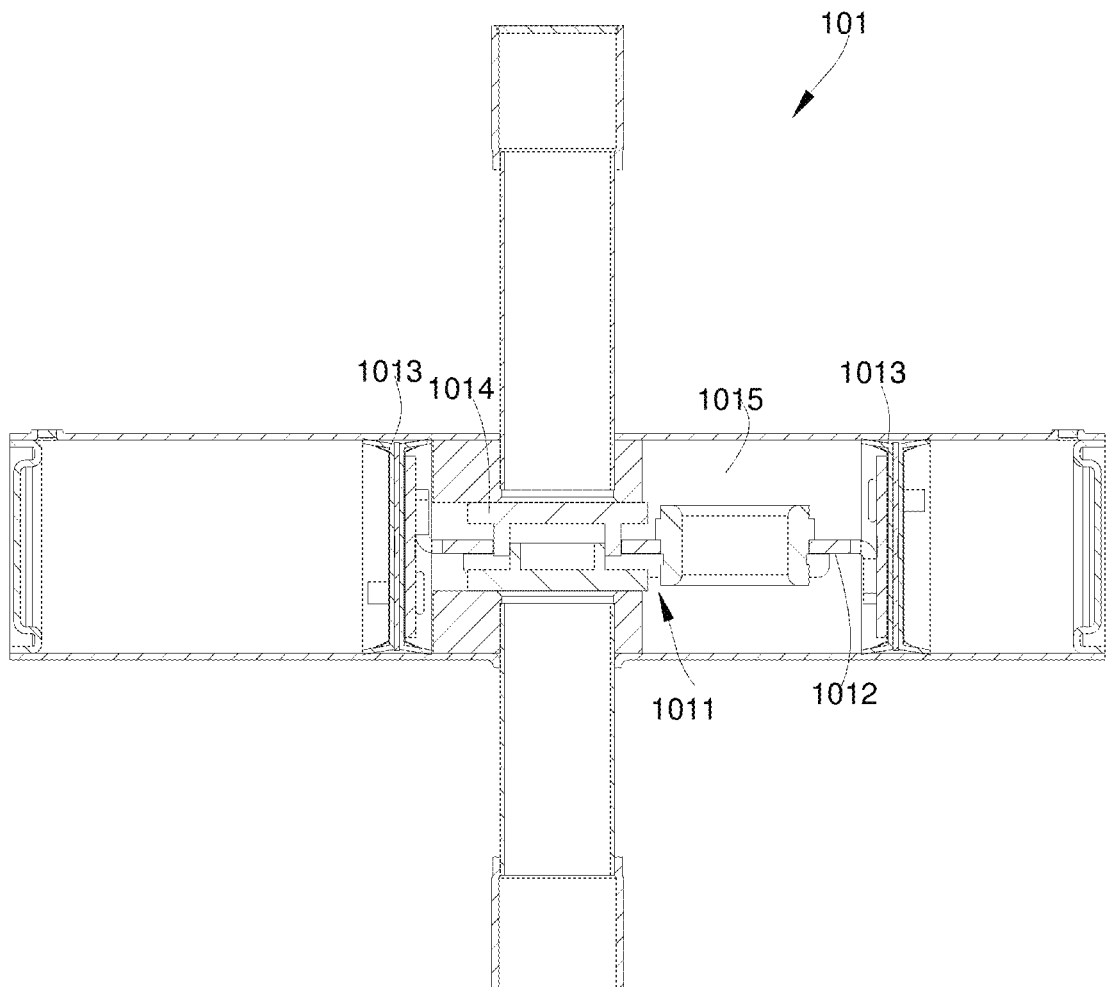
FIG. 1 is a schematic view of a reversible electromagnetic valve in a related art.

REFERENCE SIGNS 100 represents a reversible electromagnetic valve; 110 represents a pilot valve; 200 represents an air conditioning unit; 10 represents a valve body; 11 represents a first communication port; 111 represents a first connecting pipe; 12 represents a second communication port; 121 represents a second connecting pipe; 13 represents a valve cavity; 131 represents a first cavity; 132 represents a second cavity; 133 represents a medium cavity; 14 represents a first hole; 141 represents a first capillary tube; 15 represents a second hole; 151 represents a second capillary tube; 16 represents a valve base; 20 represents a valve core assembly; 21 represents a piston unit; 211 represents a first protrusion; 2111 represents a first throttling hole; 2112 represents a first throttling groove; 212 represents a second protrusion; 2121 represents a second throttling hole; 2122 represents a second throttling groove; 213 represents a first piston bowl; 214 represents a second piston bowl; 215 represents an intermediate baffle; 216 represents a first baffle; 217 represents a second baffle; 22 represents a connecting rod; 23 represents a slider unit; 231 represents a first portion; 2311 represents a balance hole; 232 represents a second portion; 233 represents an accommodating cavity; 234 represents an elastic member; 235 represents a guide frame; 30 represents an intermediate end cover; 31 represents a through hole; 311 represents a mounting groove; 312 represents a sealing ring; 32 represents a first end cover; 33 represents a second end cover; 40 represents a sleeving pipe; 50 represents a first sealing seat; 51 represents a first mounting groove; 511 represents an annular flange; 512 represents a third sealing groove; 52 represents a first through hole; 53 represents a first sealing groove; 54 represents a welding groove; 60 represents a second sealing seat; 61 represents a second through hole; 611 represents a second sealing groove; 70 represents a first sealing ring; 80 represents a second sealing ring; 90 represents a third sealing ring; 101 represents a reversible electromagnetic valve in the related art; 1011 represents a valve core assembly in the related art; 1012 represents a connecting rod in the related art; 1013 represents a piston unit in the related art; 1014 represents a slider in the related art; and 1015 represents a valve cavity in the related art.

DETAILED DESCRIPTION OF THE EMBODIMENT

The technical solutions in the embodiments of this application will be clearly and completely described below with reference to the accompanying drawings in the embodiments of the present disclosure. All other embodiments obtained by a person of ordinary skill in the art based on the embodiments of the present disclosure without creative efforts shall fall within the protection scope of the present disclosure.

It should be noted that when the component is referred to as being "mounted on" another component, it may be directly on the other component or there may be a centered component. When one component is considered to be "disposed on" another component, it may be directly disposed on another component or may have a centering component simultaneously. When one component is considered to be "fixed to" another component, it may be directly fixed on another component or there may be a centering component at the same time.

Unless otherwise defined, all technical and scientific terms used herein have the same meaning as commonly understood by one skilled in the art to which this application belongs. The terminology used herein in the specification of the present disclosure is for the purpose of describing particular embodiments only and is not intended to be limiting of the present disclosure. As used herein, the term "or/and" includes any and all combinations of one or more of the associated listed items.

Figure 13:
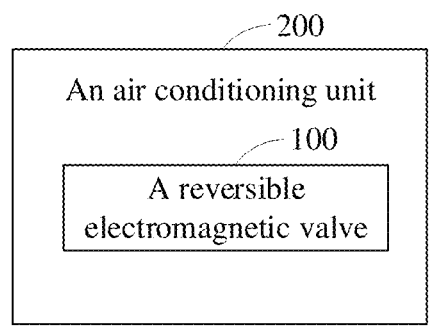
FIG. 13 is a schematic diagram of a relationship between an air conditioning unit and a reversible electromagnetic valve in some embodiments of the present disclosure.

Referring to FIG. 13, an embodiment of the present disclosure provides a reversible electromagnetic valve 100, which can be applied in an air conditioning unit 200. The reversible electromagnetic valve 100 is configured to control a communication of the pipeline or cut off the communication of the pipeline, thereby achieving bidirectional circulation of a medium.

The reversible electromagnetic valve 100 in the present disclosure can be used for an air conditioning unit 200 requiring bidirectional operation, for example, the reversible electromagnetic valve 100 can be mounted in the air conditioning unit 200 requiring two functions of a refrigeration mode and a heating mode, so as to realize bidirectional flow of a medium without switching a pipeline. The medium in the present disclosure can refer to a refrigerant.

Referring to FIG. 1, a valve core assembly 1011 of a reversible electromagnetic valve 101 in the related art includes a connecting rod 1012, a slider 1014 and two piston units 1013. The two piston units 1013 are respectively connected to two ends of the connecting rod 1012. In a process of a medium pushing the valve core assembly 1011, the two piston units 1013 need to be pushed to slide, however, it has a large friction force when the piston units 1013 slide in a sealed valve cavity 1015, a greater thrust is required for the medium pushing the two piston units 1013 to slide, therefore it needs a large valve opening pressure difference for the reversible electromagnetic valve in the related art.

Embodiment 1

Figure 3:
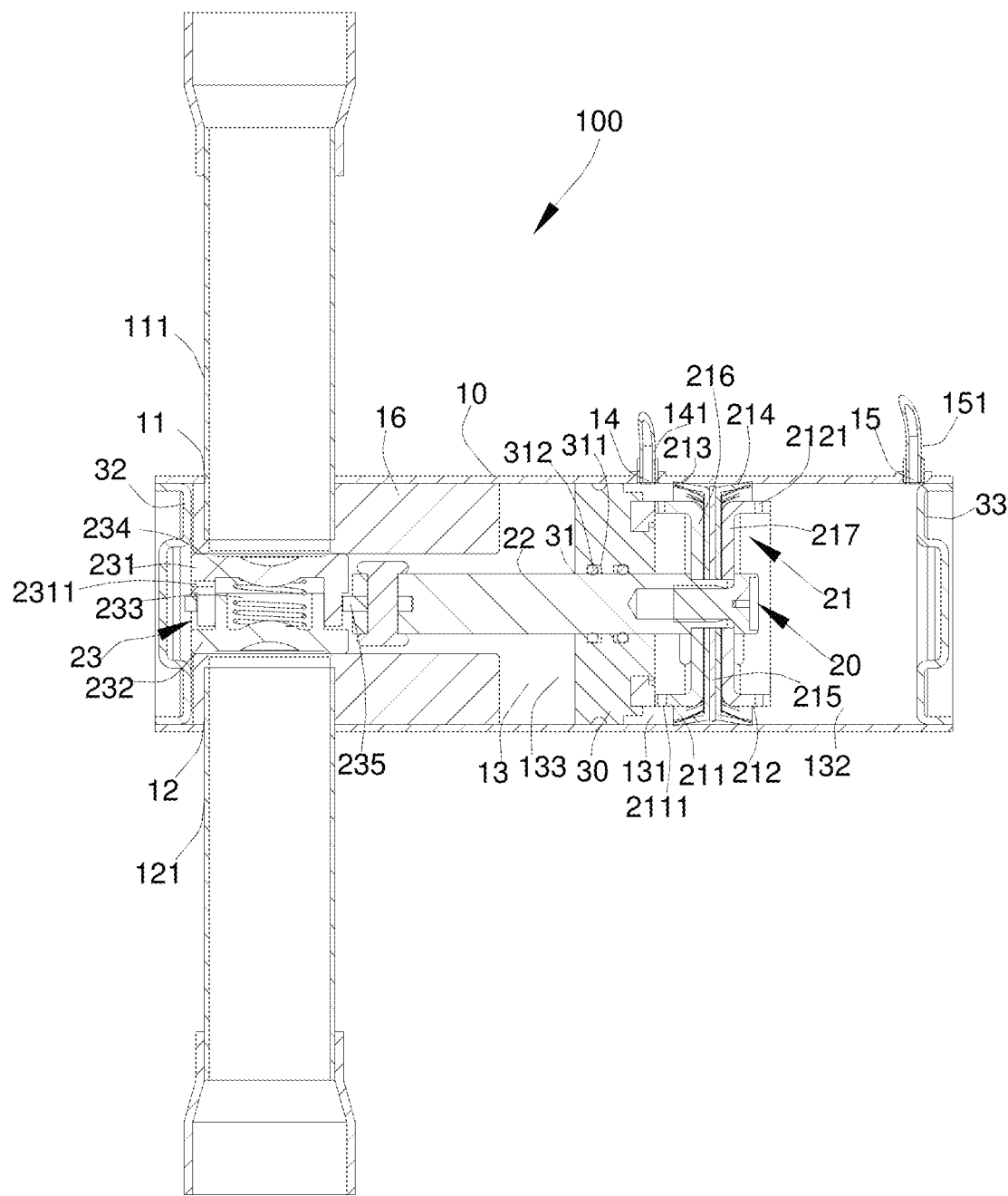
FIG. 3 is a schematic view of a reversible electromagnetic valve in some embodiments of the present disclosure.

Referring to FIG. 3, the reversible electromagnetic valve 100 in the present disclosure includes a valve body 10 and a valve core assembly 20. Two sides of the valve body 10 are respectively provided with a first communication port 11 and a second communication port 12. The valve body 10 is provided with a valve cavity 13. The valve core assembly 20 is arranged in the valve cavity 13, and the valve core assembly 20 is capable of slidably moving in the valve cavity 13 to enable the first communication port 11 and the second communication port 12 to be in communication with each other or out of communication with each other.

Further, a first connecting pipe 111 is provided in the first communication port 11. A second connecting pipe 121 is provided in the second communication port 12. And the first connecting pipe 111 and the second connecting pipe 121 are respectively connected to pipelines of the air conditioning unit.

The reversible electromagnetic valve 100 further includes a valve base 16. The valve base 16 is mounted in the valve cavity 13. The first communication port 11 and the second communication port 12 penetrate the valve body 10 and the valve base 16. And one end of the valve core assembly 20 is capable of moving in the valve base 16 to enable the first communication port 11 and the second communication port 12 to be in communication with each other or out of communication with each other.

Referring to FIG. 3, the valve core assembly 20 includes a piston unit 21, a connecting rod 22 and a slider unit 23. The slider unit 23 and the piston unit 21 are respectively connected to two ends of the connecting rod 22. The slider unit 23 is disposed adjacent to the first communication port 11 and the second communication port 12. And a pressure difference can be formed between two sides of the piston unit 21 to push the piston unit 21 to slide in the valve cavity 13.

By providing the single piston unit 21 to drive the slider unit 23 to move in the valve cavity 13, the first communication port 11 and the second communication port 12 can be in communication with each other or out of communication with each other, and the thrust required for pushing the piston unit 21 can be reduced, so that a valve opening pressure difference required when the reversible electromagnetic valve 100 is opened can be reduced. The reliability of opening and closing the reversible electromagnetic valve 100 at a low pressure can be improved. Compared to two piston units of the reversible electromagnetic valve in the related art, a single piston unit 21 in the present disclosure is provided to reduce the number of components, so that the overall volume of the reversible electromagnetic valve 100 is reduced, the reversible electromagnetic valve 100 is miniaturized, materials are saved, and the processing cost is reduced.

The first communication port 11 and the second communication port 12 are opposite to each other. The slider unit 23 is configured to block both the first communication port 11 and the second communication port 12. When the reversible electromagnetic valve 100 is in a closed state, when the first communication port 11 is an inlet, the first communication port 11 is blocked by the slider unit 23 and cannot be in communication with the second communication port 12. When the second communication port 12 is an inlet, the second communication port 12 is blocked by the slider unit 23 and cannot be in communication with the first communication port 11, so that the reversible electromagnetic valve 100 can work effectively.

In the present disclosure, the first communication port 11 of the reversible electromagnetic valve 100 can be an inlet, and after a mode of the air conditioning unit 200 is switched, the second communication port 12 can be an inlet, and when the reversible electromagnetic valve 100 is in a closed state, the slider unit 23 can block the first communication port 11 and the second communication port 12 at the same time, thereby preventing the medium from flushing the slider unit 23 and affecting a sealing performance.

Furthermore, the reversible electromagnetic valve 100 includes an intermediate end cover 30 and a second end cover 33. The intermediate end cover 30 is fixed in the valve cavity 13. The piston unit 21 is disposed on a side of the intermediate end cover 30 away from the first communication port 11 and the second communication port 12. A first cavity 131 is formed between the intermediate end cover 30 and the piston unit 21. A second cavity 132 is formed between the piston unit 21 and the second end cover 33. The first cavity 131 and the second cavity 132 are respectively located on two sides of the piston unit 21. When a pressure difference between the first cavity 131 and the second cavity 132 is formed, the piston unit 21 can be pushed to move, so as to drive the slider unit 23 to enable the first communication port 11 and the second communication port 12 to be in communication with each other or out of communication with each other.

Furthermore, the intermediate end cover 30 is provided with a through hole 31. A mounting groove 311 is located on an inner wall of the through hole 31 and configured for allowing the sealing ring 312 to be mounted. The connecting rod 22 extends into the through hole 31. A part of the connecting rod 22 extends towards the first communication port 11 and the second communication port 12, and the other part of the connecting rod 22 extends towards the second end cover 33. The connecting rod 22 is capable of moving in the through hole 31. And the connecting rod 22 and the intermediate end cover 30 are sealed with each other through a sealing ring 312.

The reversible electromagnetic valve 100 further includes a first end cover 32. The first end cover 32 is disposed at an end of the valve body 10 away from the second end cover 33. A medium cavity 133 is formed between the first end cover 32 and the intermediate end cover 30. The slider unit 23 is disposed in the medium cavity 133. When the reversible electromagnetic valve 100 is in a first position, and the first communication port 11 and the second communication port 12 are respectively in communication with the medium cavity 133. It should be noted that the first position refers to a position of each component when the reversible electromagnetic valve 100 is in an opened state. The medium cavity 133 is configured for allowing the medium to flow. When the valve core assembly 20 slides away from the first communication port 11 and the second communication port 12, the first communication port 11 can be in communication with the second communication port 12 through the medium cavity 133, so that the medium achieves bidirectional circulation.

Figure 2:
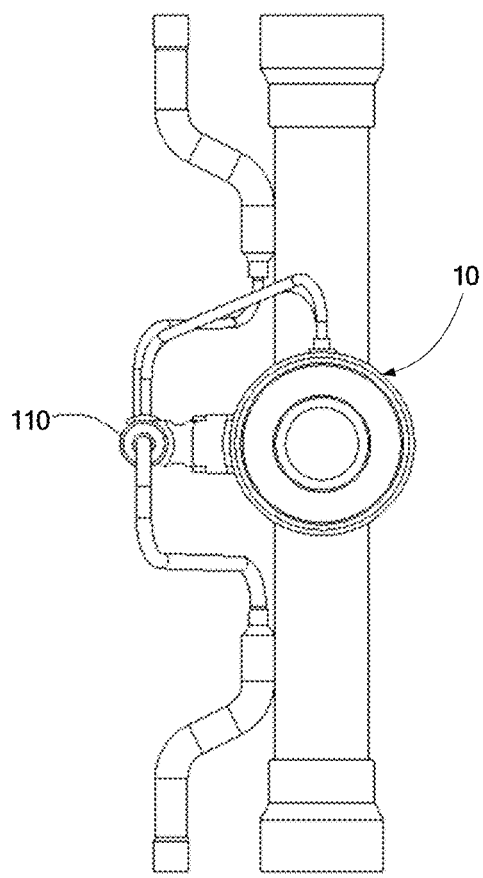
FIG. 2 is an overall structural diagram of a reversible electromagnetic valve in some embodiments of the present disclosure.

Referring to FIG. 2 and FIG. 3, specifically, the first communication port 11 and the second communication port 12 are respectively located in the medium cavity 133. The valve body 10 is provided with a first hole 14 and a second hole 15. The first hole 14 is in communication with the first cavity 131. The second hole 15 is in communication with the second cavity 132. The first hole 14 is internally provided with a first capillary tube 141. The second hole 15 is internally provided with a second capillary tube 151. The first capillary tube 141 and the second capillary tube 151 are connected to a pilot valve 110, so that a pressure difference between the first cavity 131 and the second cavity 132 is formed to push the piston unit 21 to move.

When the reversible electromagnetic valve 100 needs to be closed, a high-pressure refrigerant enters the second cavity 132 from the second capillary tube 151, and the refrigerant in the first cavity 131 flows out of the first capillary tube 141, thereby pushing the piston unit 21 to move towards the first communication port 11 and the second communication port 12. When the reversible electromagnetic valve 100 needs to be opened, the high-pressure refrigerant enters the first cavity 131 from the first capillary tube 141, and the refrigerant in the second cavity 132 flows out of the second capillary tube 151, thereby pushing the piston unit 21 to move towards the first communication port 11 and the second communication port 12.

Referring to FIG. 3, a side surface of the piston unit 21 facing the intermediate end cover 30 is provided with a first protrusion 211. When the piston unit 21 moves towards the first communication port 11 and the second communication port 12, the first protrusion 211 can abut against the intermediate end cover 30, thereby reducing an impact force of the piston unit 21 on the intermediate end cover 30.

Figure 4:
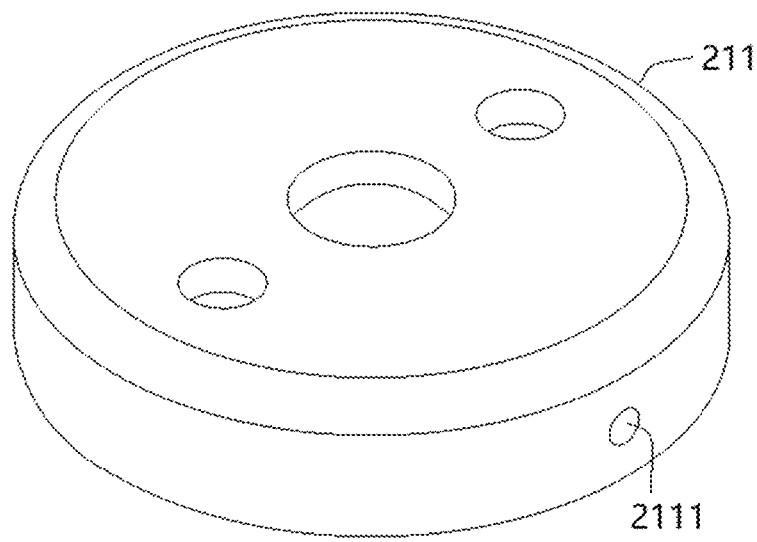
FIG. 4 is a schematic view of a throttling hole of a reversible electromagnetic valve in some embodiments of the present disclosure.

Referring to FIG. 4, furthermore, the first protrusion 211 is in an annular shape. A side wall of the first protrusion 211 is provided with a first throttling hole 2111. When the piston unit 21 is pushed to move toward the first communication port 11 and the second communication port 12, a part of the medium can slowly flow out of a groove formed by the first protrusion 211 through the first throttling hole 2111, resulting in forming a resistance, so that an impact force of the piston unit 21 on the intermediate end cover 30 is slowed down, a mounting firmness of the intermediate end cover 30 is enhanced, and noise can be reduced.

Figure 5:
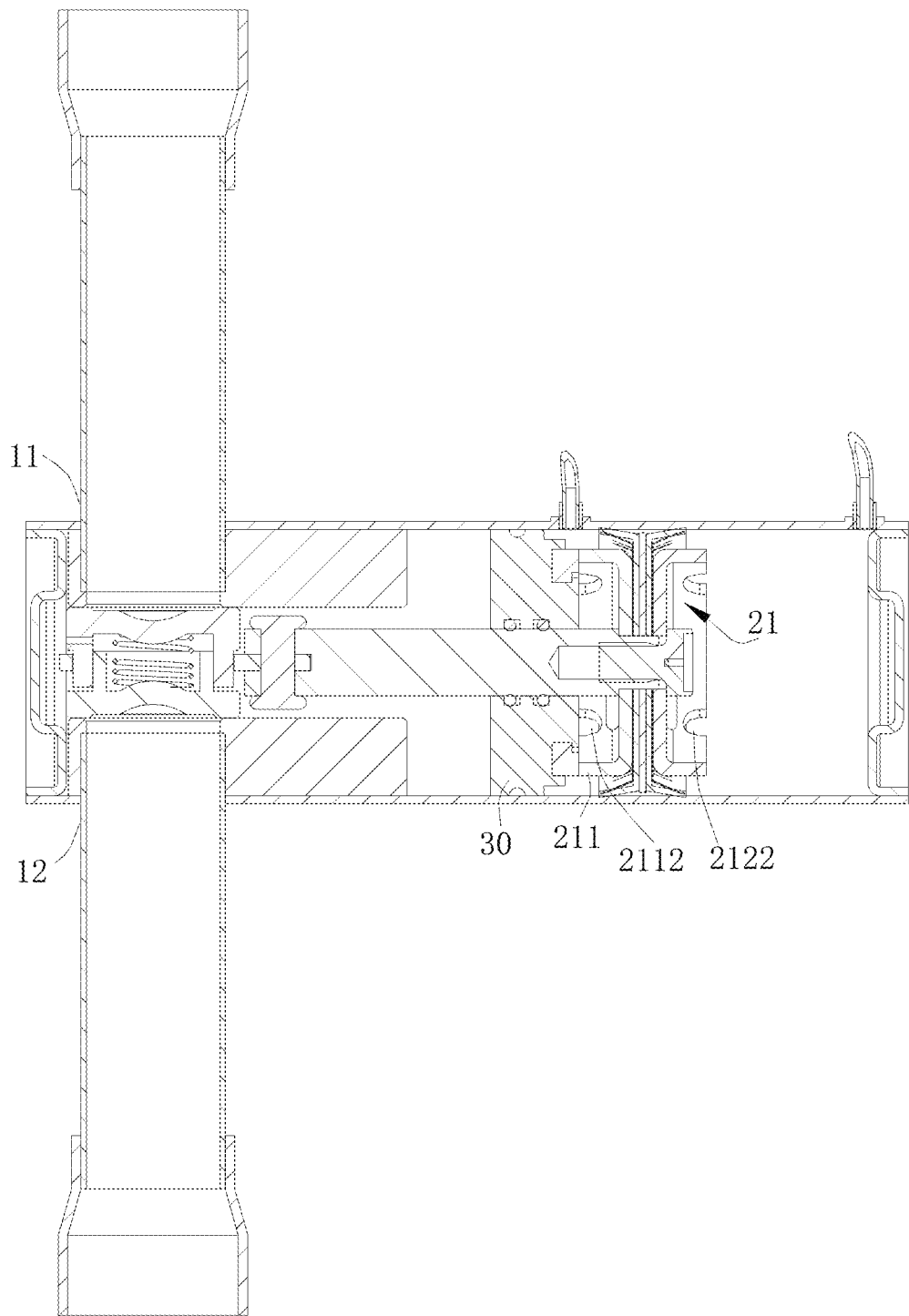
FIG. 5 is a schematic cross-sectional view of a reversible electromagnetic valve in some embodiments of the present disclosure.
Figure 6:
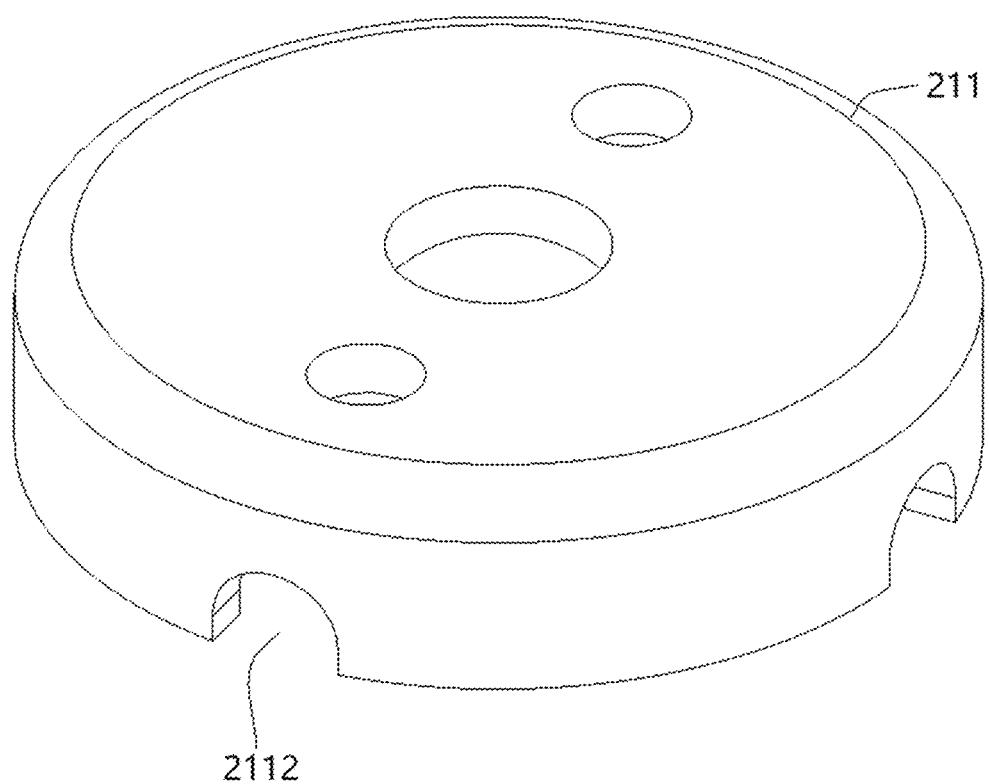
FIG. 6 is a schematic view of a throttling groove of a reversible electromagnetic valve in some embodiments of the present disclosure.

Referring to FIG. 5 and FIG. 6, in another embodiment, an end surface of the first protrusion 211 facing the intermediate end cover 30 is provided with a first throttling groove 2112. When the piston unit 21 is pushed to move towards the first communication port 11 and the second communication port 12, a part of the medium can slowly flow out of a groove formed by the first protrusion 211 through the first throttling groove 2112, resulting in forming resistance. So that an impact force of the piston unit 21 on the intermediate end cover 30 is slowed down, an installation firmness of the intermediate end cover 30 is enhanced, and noise can be reduced.

Referring to FIG. 3, in another embodiment, a side surface of the piston unit 21 facing the second end cover 33 is provided with a second protrusion 212. When the piston unit 21 moves towards the second end cover 33, the second protrusion 212 can abut against the second end cover 33, thereby reducing an impact force of the piston unit 21 on the second end cover 33.

Furthermore, the second protrusion 212 is in an annular shape. A side surface of the second protrusion 212 is provided with a second throttling hole 2121. When the piston unit 21 is pushed to move towards the second end cover 33, a part of the medium can slowly flow out of a groove formed by the second protrusion 212 through the second throttling hole 2121, resulting in forming resistance. So that an impact force of the piston unit 21 on the second end cover 33 is reduced, and noise is reduced.

Referring to FIG. 5, in another embodiment, an end surface of the second protrusion 212 facing the second end cover 33 is provided with a second throttling groove 2122. When the piston unit 21 is pushed to move towards the second end cover 33, a part of the medium can slowly flow out of a groove formed by the second protrusion 212 through the second throttling groove 2122, resulting in forming resistance. So that an impact force of the piston unit 21 on the second end cover 33 is reduced, and noise is reduced.

Specifically, the piston unit 21 includes a first piston bowl 213, a second piston bowl 214, an intermediate baffle 215, a first baffle 216 and a second baffle 217. The first baffle 216, the intermediate baffle 215 and the second baffle 217 are connected to each other. The first baffle 216 and the second baffle 217 are located on two sides of the intermediate baffle 215. The first baffle 216 is arranged adjacent to the intermediate end cover 30. The first piston bowl 213 is located between the first baffle 216 and the intermediate baffle 215. The second piston bowl 214 is located between the intermediate baffle 215 and the second baffle 217. The first protrusion 211 is disposed on the first baffle 216. And the second protrusion 212 is disposed on the second baffle 217.

Referring to FIG. 3, the slider unit 23 is disposed in the medium cavity 133. The slider unit 23 includes a first portion 231 and a second portion 232 opposite to each other. The first portion 231 is capable of blocking the first communication port 11. The second portion 232 is capable of blocking the second communication port 12. An accommodating cavity 233 is provided between the first portion 231 and the second portion 232. An elastic member 234 is disposed in the accommodating cavity 233. Two ends of the elastic member 234 abut against the first portion 231 and the second portion 232 respectively. An interaction force between the elastic member 234 and the first portion 231 and an interaction force between the elastic member 234 and the second portion 232 can enable the first portion 231 and the second portion 232 to be separated from each other, so that the first portion 231 can block the first communication port 11 and the second portion 232 can block the second communication port 12, a sealing performance during plugging can be improved.

Furthermore, the first portion 231 and/or the second portion 232 are provided with a balance hole 2311. The medium cavity 133 is in communication with the accommodating cavity 233 through the balance hole 2311. And the balance hole 2311 can balance a pressure between the medium cavity 133 and the accommodating cavity 233 to prevent the medium from extruding the slider unit 23, thereby ensuring stability of the slider unit 23.

Referring to FIG. 3, the slider unit 23 further includes a guide frame 235. The guide frame 235 is sleeved on outer sides of the first portion 231 and the second portion 232 and connected to the connecting rod 22. The guide frame 235 can play a role in limiting and guiding the slider unit 23, so that the slider unit 23 is prevented from inclining under the action of the medium, and sealing performance between the slider unit 23 and the first communication port 11 and between the slider unit 23 and the second communication port 12 are affected. Meanwhile, the first portion 231 and the second portion 232 are mounted on the guide frame 235, and the connecting rod 22 can drive the first portion 231 and the second portion 232 to slide through the guide frame 235, so that a maintenance cost can be reduced, and an utilization efficiency can be improved. When the guide frame 235 is abraded or the connecting rod 22 is damaged, only the lost part needs to be replaced, so that replacement and maintenance are facilitated, and the cost can be reduced.

The pilot valve 110 of the reversible electromagnetic valve 100 is disposed on the valve body 10 and is respectively connected to the first capillary tube 141 and the second capillary tube 151. And the pressure difference between the two sides of the piston unit 21 can be controlled by reversing the pilot valve 110, thereby pushing the piston unit 21 to move.

The working principle of the reversible electromagnetic valve 100 provided in the present disclosure is as follows:

When the reversible electromagnetic valve 100 needs to be opened, the high-pressure refrigerant is introduced into the first cavity 131 from the first capillary 141 through reversing of the pilot valve 110, and the refrigerant in the second cavity 132 flows out of the second capillary 151, so that the piston unit 21 is pushed to move towards the first communication port 11 and the second communication port 12. And the piston unit 21 drives the slider unit 23 to move through the connecting rod 22 and the guide frame 235 to release the sealing/blocking of the first communication port 11 and the second communication port 12.

When the reversible electromagnetic valve 100 needs to be closed, the high-pressure refrigerant is introduced into the second cavity 132 from the second capillary 151 through reversing of the pilot valve 110. The refrigerant in the first cavity 131 flows out of the first capillary 141, so that the piston unit 21 is pushed to move towards the first communication port 11 and the second communication port 12, and the piston unit 21 drives the slider unit 23 to move through the connecting rod 22 and the guide frame 235, so that the first communication port 11 and the second communication port 12 are blocked/sealed.

In the present disclosure, experiments verify that the single piston unit 21 is used for driving, the minimum action pressure difference is almost half of that of the two piston units 1013. The reversible electromagnetic valve 100 in the present disclosure greatly improves the reliability of the action of the reversible electromagnetic valve 100 at a low pressure. This experiment was tested in the atmospheric environment.

A friction force between the slider unit 23 and the valve base 16 is denoted as F 1. A friction force between the sealing ring 312 and the valve core assembly 20 is denoted as F2. A friction force between the piston unit 21 and an inner wall of the valve body 10 is denoted as F3. An acting force between the medium in the medium cavity 133 and the valve core assembly 20 is denoted as F4. An acting force required by closing the reversible electromagnetic valve 100 is denoted as F5. And an acting force required for opening the reversible electromagnetic valve 100 is denoted as F6.

Since the valve base 16 is provided with the first communication port 11 and the second communication port 12, and the first communication port 11 and the second communication port 12 are both in contact with the air, the friction force F1 between the slider unit 23 and the valve base 16 and the acting force F4 between the medium in the medium cavity 133 and the valve core assembly 20 approach to 0. The acting force F5 required by closing the reversible electromagnetic valve 100 is a product of a pressure of the medium in the second cavity 132 and a contact area between the piston unit 21 and the medium in the second cavity 132, wherein the contact area between the piston unit 21 and the medium in the second cavity 132 is the area of the piston unit 21 facing a side surface of the second cavity 132. The acting force F6 required for opening the reversible electromagnetic valve 100 is a product of a pressure of the medium in the first cavity 131 and a contact area between the piston unit 21 and the medium in the first cavity 131, wherein the contact area between the piston unit 21 and the medium in the first cavity 131 is a difference of the area of the piston unit 21 facing a side surface of the first cavity 131 minus a cross-sectional area of the connecting rod 22 perpendicular to an axis direction of the connecting rod 22.

Specifically, when the reversible electromagnetic valve 100 is closed, the friction force F1 between the slider unit 23 and the valve base 16, the friction force F2 between the sealing ring 312 and the valve core assembly 20, the friction force F3 between the piston unit 21 and the inner wall of the valve body 10, the acting force F4 between the medium in the medium cavity 133 and the valve core assembly 20, and the acting force F5 required by closing the reversible electromagnetic valve 100 satisfy the following relationship: $F5>F1+F2+F3+F4$. According to the above description, the friction force F1 between the slider unit 23 and the valve base 16 and the acting force F4 between the medium in the medium cavity 133 and the valve core assembly 20 approach to 0, the friction force F2 between the sealing ring 312 and the valve core assembly 20, the friction force F3 between the piston unit 21 and the inner wall of the valve body 10, and the acting force F5 required by closing the reversible electromagnetic valve 100 satisfy the following relationship: $F5>F2+F3$.

When the reversible electromagnetic valve 100 is opened, the friction force F1 between the slider unit 23 and the valve base 16, the friction force F2 between the sealing ring 312 and the valve core assembly 20, the friction force F3 between the piston unit 21 and the inner wall of the valve body 10, the acting force F4 between the medium in the medium cavity 133 and the valve core assembly 20, the acting force F5 required by closing the reversible electromagnetic valve 100, and the acting force F6 required for opening the reversible electromagnetic valve 100 satisfy the following relationship: $F4+F6>F1+F2+F3+F5$. According to the above description, the friction force F1 between the slider unit 23 and the valve base 16, the acting force F4 between the medium in the medium cavity 133 and the valve core assembly 20, and the acting force F5 required by closing the reversible electromagnetic valve 100 approach to 0, the friction force F2 between the sealing ring 312 and the valve core assembly 20, the friction force F3 between the piston unit 21 and the inner wall of the valve body 10, and the acting force F6 required for opening the reversible electromagnetic valve 100 satisfy the following relationship: F6>F2+F3.

The valve opening pressure difference is mainly caused by resistance, and the resistance of the reversible electromagnetic valve 100 in the valve opening process is mainly the friction force F2 between the sealing ring 312 and the valve core assembly 20 and the friction force F3 between the piston unit 21 and the inner wall of the valve body 10. The friction force F2 between the sealing ring 312 and the valve core assembly 20 is less than the friction force F3 between the piston unit 21 and the inner wall of the valve body 10. It can be concluded from experiments that a minimum value of the valve opening pressure difference is approximately 0.11 MPa if the two piston units 1013 are used, however, a minimum value of the valve opening pressure difference is approximately 0.06 MPa in the reversible electromagnetic valve 100 in which the single piston unit 21 is used, and almost a half of that if the two piston units 1013 are used. Thus, compared to the traditional reversible electromagnetic valve with the two piston units, the reversible electromagnetic valve 100 in the present disclosure has less friction force and the valve opening pressure difference is less. Furthermore, a length of the valve core assembly 20 along the axial direction is less and a volume thereof is smaller, thereby decreasing the volume of space that needs to be occupied during installation, saving materials and reducing costs.

Embodiment 2

Figure 7:
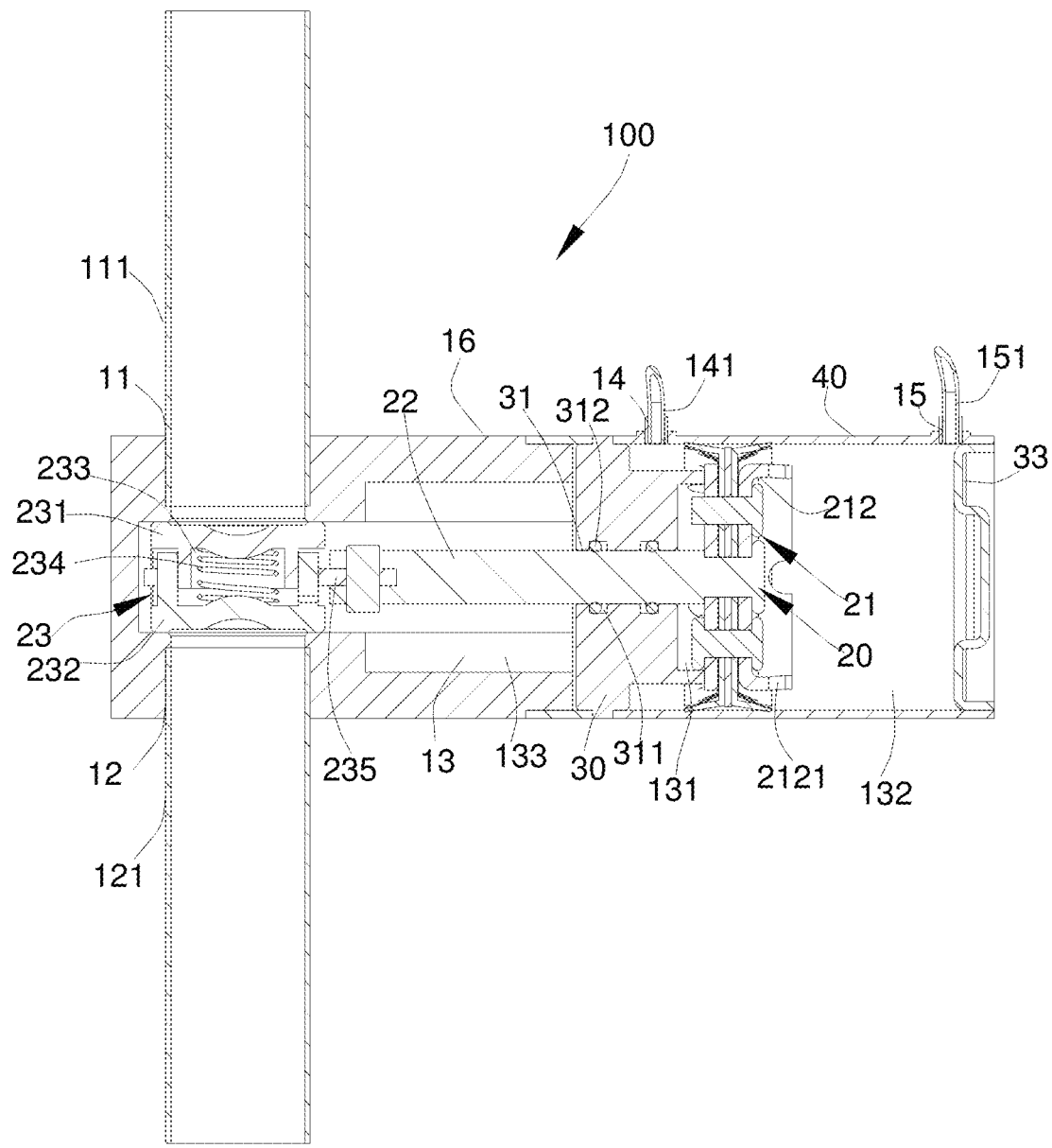
FIG. 7 is a schematic cross-sectional view of a reversible electromagnetic valve in some embodiments of the present disclosure.

Referring to FIG. 7, a structure, a working principle and a valve opening pressure difference verification principle of a reversible electromagnetic valve in the embodiment 2 is substantially the same as those of the reversible electromagnetic valve 100 in the embodiment 1, and so as, which are not repeated here, except that a structure of a valve body 10 in embodiment 2 is different.

In this embodiment, the valve body 10 is separately disposed.

The valve body 10 in this embodiment includes a valve base 16 and a sleeve pipe 40. An intermediate end cover 30 is disposed between the valve base 16 and the sleeve pipe 40. And the intermediate end cover 30 is fixedly connected to the valve body 10 and the sleeve pipe 40, respectively.

A first end cover 32 can be disposed at an end of the valve base 16 away from the sleeve pipe 40. Alternatively, the first end cover 32 can be not additionally provided, and the valve base 16 and the first end cover 32 can be an integral structure. A connecting rod 22 penetrates through the intermediate end cover 30. A slider unit 23 is located in the valve base 16 and can slide in the valve base 16. The piston unit 21 is located in the sleeve pipe 40 and abuts against an inner wall of the sleeve pipe 40, and the piston unit 21 is configured to drive the slider unit 23 to enable a first communication port 11 and a second communication port 12 to be in communication with each other or out of communication with each other under an action of a pressure difference between the two sides of the piston unit 21.

Embodiment 3

Figure 8:
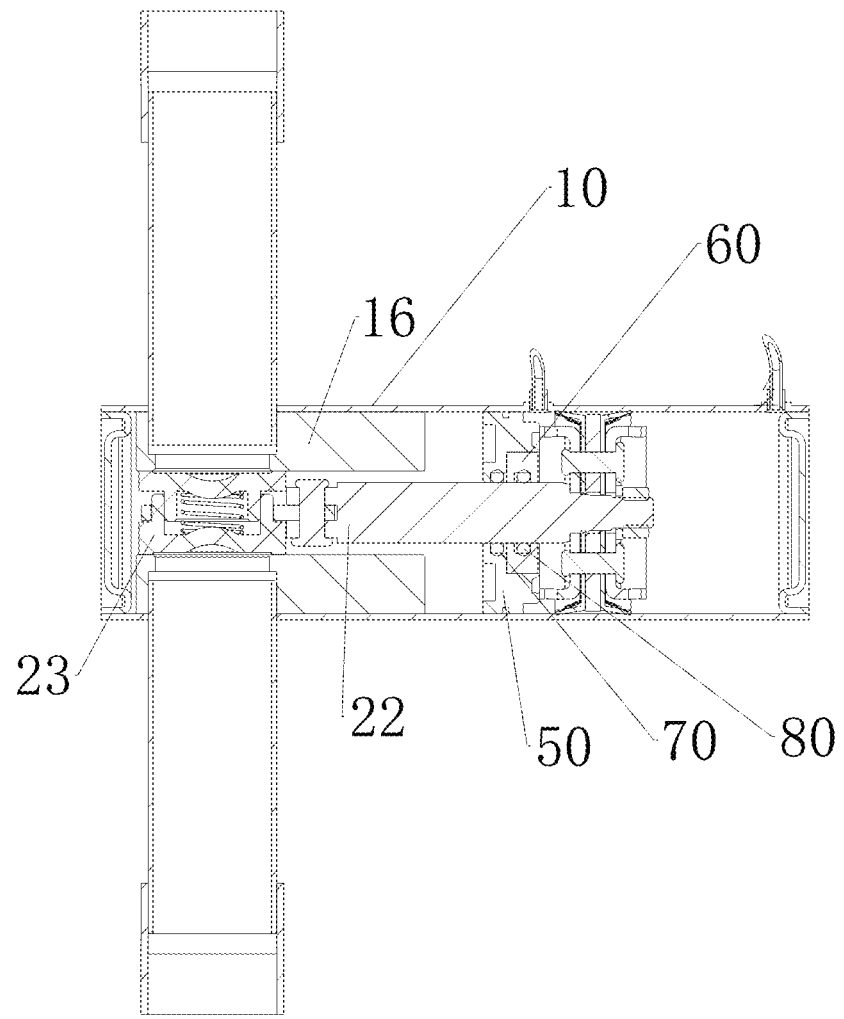
FIG. 8 is a schematic cross-sectional view of a reversible electromagnetic valve in some embodiments of the present disclosure.
Figure 9:
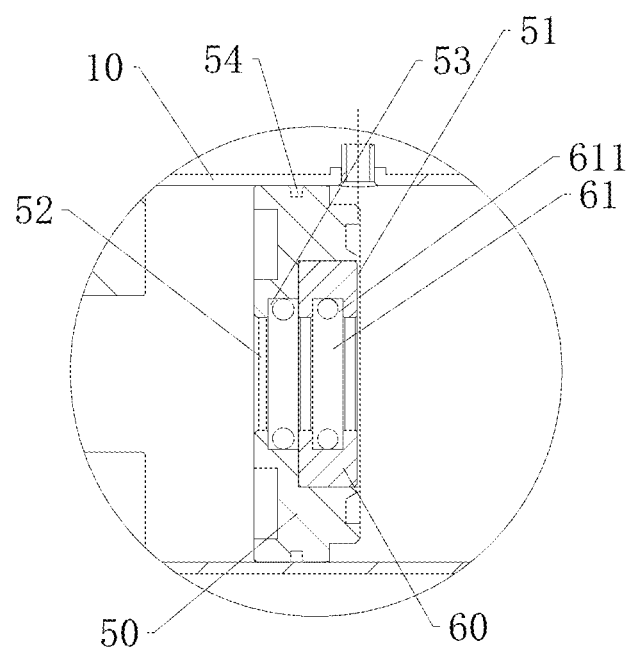
FIG. 9 is a partial enlarged schematic view of the reversible electromagnetic valve in FIG. 8.

Referring to FIG. 8 and FIG. 9, the reversible electromagnetic valve includes a valve body 10, a valve base 16, a slider unit 23 and a connecting rod 22. The valve base 16 is disposed in the valve body 10. The valve base 16 is provided with a valve port. The slider unit 23 is slidably disposed in the valve base 16 to close or open the valve port. And the connecting rod 22 and the slider unit 23 are in driving connection.

The reversible electromagnetic valve includes a first sealing seat 50 and a second sealing seat 60. The first sealing seat 50 is disposed in the valve body 10. The first sealing seat 50 is provided with a first mounting groove 51. An opening of the first mounting groove 51 can face away from the valve base 16 (or, away from the slider unit 23). And the second sealing seat 60 is disposed in the first mounting groove 51.

The reversible electromagnetic valve 100 includes a first sealing ring 70 and a second sealing ring 80. The first sealing ring 70 is disposed in the first sealing seat 50. The second sealing ring 80 is disposed in the second sealing seat 60. And the connecting rod 22 penetrates through the first sealing ring 70 and the second sealing ring 80.

By providing the first sealing seat 50 and the second sealing seat 60 and arranging the second sealing seat 60 in the first mounting groove 51, the first sealing ring 70 is first mounted in the first sealing seat 50, the second sealing ring 80 is then mounted in the second sealing seat 60, and the second sealing seat 60 together with the second sealing ring 80 are mounted in the first mounting groove 51. In this way, the first sealing ring 70 and the second sealing ring 80 can be respectively assembled into the first sealing seat 50 and the second sealing seat 60 more simply and quickly, so that the problem that the sealing ring is difficult to assemble into the sealing seat will be effectively solved.

The intermediate end cover 30 of the reversible electromagnetic valve in embodiment 1 may include the first sealing seat 50 and the second sealing seat 60 in embodiment 3, and the following descriptions related to the first sealing seat 50 and the second sealing seat 60 may all be applied to embodiment 1.

The first sealing seat 50 is further provided with a first through hole 52 and a first sealing groove 53. The first through hole 52, the first sealing groove 53 and the first mounting groove 51 are sequentially in communication with each other. Diameters of the first through hole 52, the first sealing groove 53 and the first mounting groove 51 are sequentially increased. The first sealing ring 70 is arranged in the first sealing groove 53. The second sealing seat 60 is provided with a second through hole 61. An inner wall of the second through hole 61 is provided with a second sealing groove 611. A diameter of the second through hole 61 is less than that of the first sealing groove 53. The second sealing ring 80 is arranged in the second sealing groove 611. The first through hole 52, the first sealing groove 53 and the first mounting groove 51 are sequentially in communication with each other to facilitate the connecting rod 22 to pass through. The first sealing groove 53 is provided to facilitate accommodating and mounting of the first sealing ring 70. By providing the second through hole 61 and a diameter of the second through hole 61 being smaller than a diameter of the first sealing groove 53, it can be ensured that the connecting rod 22 smoothly passes, and the first sealing ring 70 can also be limited to prevent the first sealing ring 70 from entering the second through hole 61. And the second sealing groove 611 is provided to facilitate accommodating and mounting of the second sealing ring 80.

Furthermore, a size of the first sealing groove 53 along an axial direction of the connecting rod 22 is greater than a size of the first sealing ring 70. A diameter of the first through hole 52 is equal to that of the second through hole 61. A diameter of the first sealing ring 70 is equal to that of the second sealing ring 80. By providing the size of the first sealing groove 53 along an axial direction of the connecting rod 22 being greater than a size of the first sealing ring 70, the first sealing ring 70 is capable of moving in the first sealing groove 53. Because a pressure of one end of the first sealing seat 50 towards the valve base 16 is greater than that of the other end of the first sealing seat 50, a thrust in a direction away from the valve base 16 can be generated, so that the first sealing ring 70 can be pushed to move towards the second sealing seat 60. In this way, it can ensure that a sealing effect of the first sealing ring 70, an area of the second sealing seat 60 being subject to the thrust can be reduced, the second sealing seat 60 is prevented from being separated from the first sealing seat 50 by a large thrust, thereby improving a stability of the second sealing seat 60 during operation.

Figure 10:
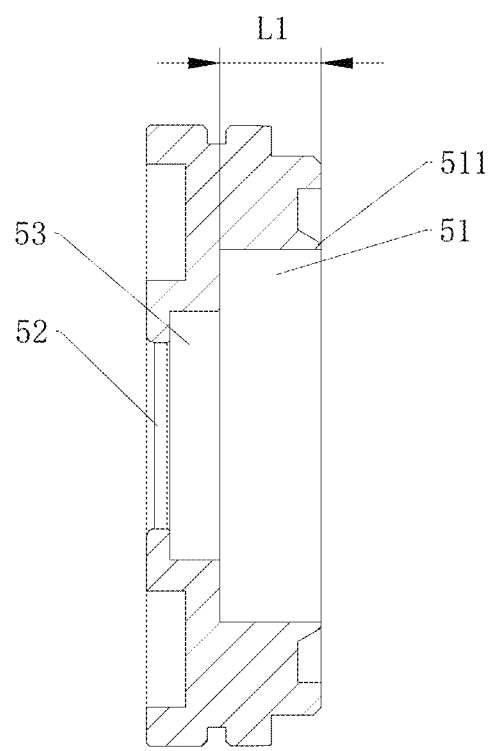
FIG. 10 is a schematic cross-sectional view of a first sealing seat of a reversible electromagnetic valve in some embodiments of the present disclosure.

Specifically, referring to FIG. 10, a periphery of the opening of the first mounting groove 51 is provided with an annular flange 511. The second sealing seat 60 is pressed into the first mounting groove 51 from an opening of the first mounting groove 51. The annular flange 511 and the second sealing seat 60 are riveted. By providing the annular flange 511 being arranged on the periphery of the opening of the first mounting groove 51, the first sealing seat 60 and the second sealing seat 60 can be riveted conveniently, and a connection therebetween is more stable and reliable by adopting a riveting connection mode. And the annular flange 511 can be a part of the first sealing seat 50.

Figure 11:
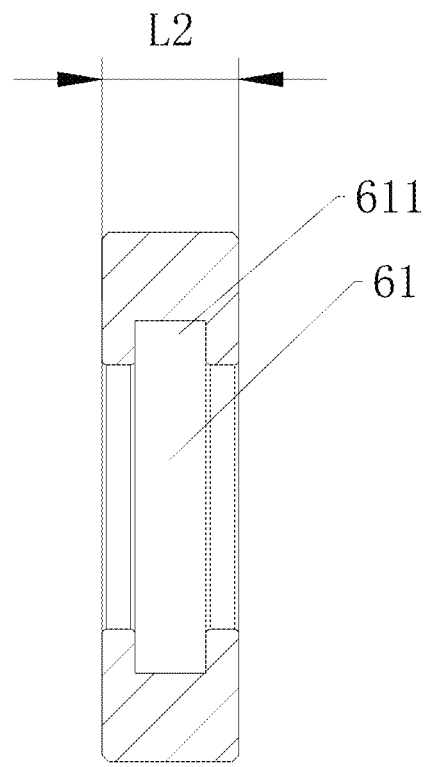
FIG. 11 is a schematic cross-sectional view of a second sealing seat of a reversible electromagnetic valve in some embodiments of the present disclosure.

Referring to FIG. 10 and FIG. 11, before the annular flange 511 is riveted, a depth of the first mounting groove 51 is denoted as L1. An outer wall of the second sealing seat 60 is in a cylindrical shape. An axial length of the second sealing seat 60 is denoted as L2. The depth L1 of the first mounting groove 51 and the axial length L2 of the second sealing seat 60 satisfy the following relational expressions: L1>L2. The annular flange 511 and an end surface of the second sealing seat 60 are riveted. By limiting the depth L1 of the first mounting groove 51 and the axial length L2 of the second sealing seat 60 in the above range, it can be ensured that the annular flange 511 and the end surface of the second sealing seat 60 are smoothly riveted.

An inner wall of the first mounting groove 51 and an outer wall of the second sealing seat 60 can be in threaded connection, which is convenient to mount and dismount. Alternatively, the inner wall of the first mounting groove 51 and the outer wall of the second sealing seat 60 may also be laser welded. By adopting laser welding, the stability and reliability of the connection between the inner wall of the first mounting groove 51 and the outer wall of the second sealing seat 60 are improved.

Figure 12:
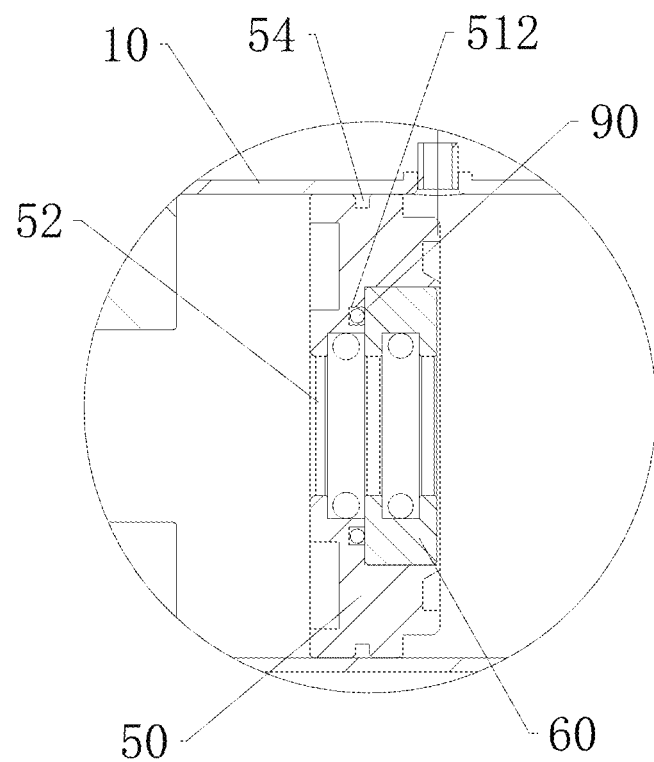
FIG. 12 is a schematic cross-sectional view of an intermediate end cover of a reversible electromagnetic valve in some embodiments of the present disclosure.

Furthermore, as shown in FIG. 12, a third sealing groove 512 is formed in a bottom wall of the first mounting groove 51. The third sealing groove 512 is arranged around the first sealing ring 70. The reversible electromagnetic valve 100 further includes a third sealing ring 90, and the third sealing ring 90 is arranged in the third sealing groove 512. The third sealing ring 90 abuts against an end surface of the second sealing seat 60. By providing the third sealing groove 512 in the bottom wall of the first mounting groove 51 and the third sealing ring 90 abutting against the end surface of the second sealing seat 60, a sealing effect between the first sealing seat 50 and the second sealing seat 60 can be improved, and a thrust on the second sealing seat 60 due to high pressure can be reduced, thereby improving the stability of the second sealing seat 60 during operation. The sealing effect between the first sealing seat 50 and the second sealing seat 60 is prevented from being affected after the first sealing ring 70 fails.

Furthermore, in the above embodiment, an outer wall of the first sealing seat 50 is provided with a welding groove 54, and the outer wall of the first sealing seat 50 and the inner wall of the valve body 10 are welded. By providing the welding groove 54 on the outer wall of the first sealing seat 50, it is convenient to weld the first sealing seat 50 with the inner wall of the valve body 10.

Referring to FIG. 13, the present disclosure further provides an air conditioning unit 200, including the reversible electromagnetic valve 100 described above.

All the technical features of the above embodiments may be combined arbitrarily, so that the description is concise, and all possible combinations of the technical features in the above embodiments are not described, however, as long as there is no contradiction in the combination of these technical features, it should be considered that the scope of the present specification is set forth.

The above embodiments only express several embodiments of the present disclosure, and the description thereof is more specific and detailed, but cannot be understood as a limitation on the application patent scope. It should be noted that, for a person of ordinary skill in the art, several variations and improvements may be made without departing from the concept of the present disclosure, all of which fall within the protection scope of the present disclosure. Therefore, the scope of protection of the present disclosure shall be subject to the appended claims.

What is claimed is:

1. A reversible electromagnetic valve, comprising a valve body and a valve core assembly, wherein a first communication port and a second communication port are respectively formed in two sides of the valve body, the valve body is provided with a valve cavity, the valve core assembly is arranged in the valve cavity, and the valve core assembly is capable of slidably moving in the valve cavity to enable the first communication port and the second communication port to be in communication with each other or out of communication with each other;

the valve core assembly comprises a piston unit, a connecting rod and a slider unit, the slider unit and the piston unit are respectively connected to two ends of the connecting rod, the slider unit is arranged adjacent to the first communication port and the second communication port, the first communication port and the second communication port are opposite to each other, the slider unit is configured to block the first communication port and the second communication port at the same time, and the piston unit is capable to be pushed to slide in the valve cavity due to a pressure difference between two sides of the piston unit;

the reversible electromagnetic valve further comprises an intermediate end cover and a second end cover, wherein the intermediate end cover is fixed in the valve cavity, the piston unit is arranged on one side of the intermediate end cover away from the first communication port and the second communication port, a first cavity is defined by the intermediate end cover and the piston unit, and a second cavity is defined by the piston unit and the second end cover;

the intermediate end cover comprises a first sealing seat and a second sealing seat, the first sealing seat is arranged in the valve body, the first sealing seat is provided with a first mounting groove, an opening of the first mounting groove is away from the slider unit, and the second sealing seat is arranged in the first mounting groove;

the reversible electromagnetic valve further comprises a first sealing ring and a second sealing ring, the first sealing ring is arranged in the first sealing seat, the second sealing ring is arranged in the second sealing seat, and the connecting rod penetrates through the first sealing ring and the second sealing ring, and a diameter of the first sealing ring is equal to that of the second sealing ring.

2. The reversible electromagnetic valve of claim 1, further comprising a pilot valve, wherein the pilot valve is disposed on the valve body, the valve body is provided with a first hole and a second hole, the first hole is in communication with the first cavity, the second hole is in communication with the second cavity, the pilot valve is respectively in communication with the first hole and the second hole through capillary tubes, and the pilot valve is configured to control a pressure difference between the first cavity and the second cavity.

3. The reversible electromagnetic valve of claim 1, further comprising a first end cover, wherein the first end cover is disposed at an end of the valve body away from the second end cover, a medium cavity is defined between the first end cover and the intermediate end cover, the slider unit is disposed in the medium cavity, and when the reversible electromagnetic valve is in a first position, the first communication port and the second communication port are respectively in communication with the medium cavity.

4. The reversible electromagnetic valve of claim 1, wherein a side surface of the piston unit facing the intermediate end cover is provided with a first protrusion, and when the piston unit moves towards the first communication port and the second communication port, the first protrusion is capable of abutting against the intermediate end cover; and/or a side surface of the piston unit facing the second end cover is provided with a second protrusion, and when the piston unit moves towards the second end cover, the second protrusion is capable of abutting against the second end cover.

5. The reversible electromagnetic valve of claim 1, wherein a side surface of the piston unit facing the intermediate end cover is provided with a first protrusion, the first protrusion is in an annular shape, a side surface of the first protrusion is provided with a first throttling hole for allowing a medium to flow out of a groove formed by the first protrusion; and/or a side surface of the piston unit facing the second end cover is provided with a second protrusion, the second protrusion is in an annular shape, a side surface of the second protrusion is provided with a second throttling hole for allowing a medium to flow out of a groove formed by the second protrusion.

6. The reversible electromagnetic valve of claim 1, wherein a side surface of the piston unit facing the intermediate end cover is provided with a first protrusion, the first protrusion is in an annular shape, a side surface of the first protrusion is provided with a first throttling groove for allowing a medium to flow out of a groove formed by the first protrusion; and/or a side surface of the piston unit facing the second end cover is provided with a second protrusion, the second protrusion is in an annular shape, a side surface of the second protrusion is provided with a second throttling groove for allowing a medium to flow out of a groove formed by the second protrusion.

7. The reversible electromagnetic valve of claim 1, wherein the slider unit comprises a first portion and a second portion opposite to each other, the first portion is capable of blocking the first communication port, the second portion is capable of blocking the second communication port, an accommodating cavity is formed between the first portion and the second portion, an elastic member is arranged in the accommodating cavity, and two ends of the elastic member abut against the first portion and the second portion respectively.

8. The reversible electromagnetic valve of claim 7, wherein the valve cavity comprises a medium cavity, the slider unit is arranged in the medium cavity, a balance hole is formed in the first portion and/or the second portion, and the medium cavity is in communication with the accommodating cavity through the balance hole; and/or the slider unit further comprises a guide frame, and the guide frame is sleeved on an outer side of the first portion and the second portion and connected to the connecting rod.

9. The reversible electromagnetic valve of claim 1, wherein the first sealing seat is further provided with a first through hole and a first sealing groove, the first through hole, the first sealing groove and the first mounting groove are sequentially in communication with each other, diameters of the first through hole, the first sealing groove and the first mounting groove are sequentially increased, and the first sealing ring is arranged in the first sealing groove;

the second sealing seat is provided with a second through hole, an inner wall of the second through hole is provided with a second sealing groove, a diameter of the second through hole is less than that of the first sealing groove, and the second sealing ring is arranged in the second sealing groove.

10. The reversible electromagnetic valve of claim 9, wherein a size of the first sealing groove along an axial direction of the connecting rod is greater than a size of the first sealing ring, a diameter of the first through hole is equal to that of the second through hole.

11. The reversible electromagnetic valve of claim 1, wherein an inner wall of the first mounting groove is in threaded connection with an outer wall of the second sealing seat; and/or an outer wall of the first sealing seat is provided with a welding groove.

12. An air conditioning unit, comprising the reversible electromagnetic valve of claim 1.

13. A reversible electromagnetic valve, comprising a valve body and a valve core assembly, wherein a first communication port and a second communication port are respectively formed in two sides of the valve body, the valve body is provided with a valve cavity, the valve core assembly is arranged in the valve cavity, and the valve core assembly is capable of slidably moving in the valve cavity to enable the first communication port and the second communication port to be in communication with each other or out of communication with each other;

the valve core assembly comprises a piston unit, a connecting rod and a slider unit, the slider unit and the piston unit are respectively connected to two ends of the connecting rod, the slider unit is arranged adjacent to the first communication port and the second communication port, the first communication port and the second communication port are opposite to each other, the slider unit is configured to block the first communication port and the second communication port at the same time, and the piston unit is capable to be pushed to slide in the valve cavity due to a pressure difference between two sides of the piston unit;

the reversible electromagnetic valve further comprises an intermediate end cover and a second end cover, wherein the intermediate end cover is fixed in the valve cavity, the piston unit is arranged on one side of the intermediate end cover away from the first communication port and the second communication port, a first cavity is defined by the intermediate end cover and the piston unit, and a second cavity is defined by the piston unit and the second end cover;

the intermediate end cover comprises a first sealing seat and a second sealing seat, the first sealing seat is arranged in the valve body, the first sealing seat is provided with a first mounting groove, an opening of the first mounting groove is away from the slider unit, and the second sealing seat is arranged in the first mounting groove;

the reversible electromagnetic valve further comprises a first sealing ring and a second sealing ring, the first sealing ring is arranged in the first sealing seat, the second sealing ring is arranged in the second sealing seat, and the connecting rod penetrates through the first sealing ring and the second sealing ring;

a third sealing groove is formed in a bottom wall of the first mounting groove, the third sealing groove is arranged around the first sealing ring, the reversible electromagnetic valve further comprises a third sealing ring, the third sealing ring is arranged in the third sealing groove, and the third sealing ring abuts against an end surface of the second sealing seat.

14. A reversible electromagnetic valve, comprising:

a valve body, a valve seat, a slider unit and a connecting rod, wherein the valve seat is disposed in the valve body, the valve seat is provided with a valve port, and the slider unit is slidably disposed in the valve seat to close or open the valve port, the connecting rod is in driving connection with the slider unit;

a first sealing seat and a second sealing seat, wherein the first sealing seat is arranged in the valve body, the first sealing seat is provided with a first mounting groove, an opening of the first mounting groove is away from the valve seat, and the second sealing seat is arranged in the first mounting groove;

a first sealing ring and a second sealing ring, wherein the first sealing ring is arranged in the first sealing seat, the second sealing ring is arranged in the second sealing seat, and the connecting rod penetrates through the first sealing ring and the second sealing ring, and a diameter of the first sealing ring is equal to that of the second sealing ring.

15. The reversible electromagnetic valve of claim 14, wherein the first sealing seat is further provided with a first through hole and a first sealing groove, the first through hole, the first sealing groove and the first mounting groove are sequentially in communication with each other, diameters of the first through hole, the first sealing groove and the first mounting groove are sequentially increased, and the first sealing ring is arranged in the first sealing groove;

the second sealing seat is provided with a second through hole, an inner wall of the second through hole is provided with a second sealing groove, a diameter of the second through hole is less than that of the first sealing groove, and the second sealing ring is arranged in the second sealing groove.

16. The reversible electromagnetic valve of claim 15, wherein a size of the first sealing groove along an axial direction of the connecting rod is greater than a size of the first sealing ring, a diameter of the first through hole is equal to that of the second through hole.

17. The reversible electromagnetic valve of claim 14, wherein an inner wall of the first mounting groove is in threaded connection with an outer wall of the second sealing seat; and/or an outer wall of the first sealing seat is provided with a welding groove.

18. The reversible electromagnetic valve of claim 14, wherein a third sealing groove is formed in a bottom wall of the first mounting groove, the third sealing groove is arranged around the first sealing ring, the reversible electromagnetic valve further comprises a third sealing ring, the third sealing ring is arranged in the third sealing groove, and the third sealing ring abuts against an end surface of the second sealing seat.

* * * * *